ized Staes Patent [19] [11] 4,076,216
Nussbaum [45] Feb. 28, 1978

[54] HOIST MECHANISM
[76] Inventor: Hans Nussbaum, Korker Str. 6, 7641 Bodersweier, Germany
[21] Appl. No.: 750,418
[22] Filed: Dec. 14, 1976
[30] Foreign Application Priority Data
Dec. 16, 1975 Germany .............................. 2556691
[51] Int. Cl.² ............................................... B66F 3/08
[52] U.S. Cl. ..................................................... 254/98
[58] Field of Search ................. 254/7 R, 7 B, 7 C, 98, 254/99, 100, 101, 102, 103, 86 R

[56] References Cited
U.S. PATENT DOCUMENTS

| | | | |
|---|---|---|---|
| 2,910,270 | 10/1959 | Schultz | 254/98 |
| 3,309,060 | 3/1967 | Villars | 254/7 C |
| 3,888,464 | 6/1975 | Felsen | 254/86 R |
| 3,962,737 | 6/1976 | James | 254/7 R |

Primary Examiner—Robert C. Watson
Attorney, Agent, or Firm—Wegner, Stellman, McCord, Wiles & Wood

[57] ABSTRACT

A hoist mechanism for lifting a load includes a hollow support post, a threaded spindle rotatably mounted within the post, a traveling nut carried by the spindle for movement therealong during rotation of the spindle, a carriage engaged by the traveling nut to move along the spindle, and a motor for effecting rotation of the spindle. The post has a longitudinal opening aligned with the spindle having a width permitting the spindle to be moved laterally therethrough. The spindle is releasably connected to the motor drive shaft at one end and to a support bearing at the other end. Lift arms for supporting a load are connected to the carriage through the post opening. The hoist mechanism also includes a clutch mechanism providing a braking force during lowering and a safety switch assembly for terminating operation whenever the lift arms are blocked.

22 Claims, 6 Drawing Figures

HOIST MECHANISM

The invention relates generally to a hoist mechanism and, more particularly, to a jacking device for lifting heavy loads including a hollow post, a threaded spindle rotatably supported within the post, a traveling nut carried by the spindle and a load-bearing carriage mounted within the post and moved along the spindle by the traveling nut.

Lift jacks for trucks and other vehicles employing a sliding carriage supported by a traveling nut are known in the art. In prior art constructions, removal of the threaded spindle, which is usually driven by a motor through gearing at its upper end and supported by a bearing at its lower end, usually required trained personnel and a considerable expenditure of time. Consequently, replacement of the spindle because of wear was extremely costly.

It is therefore an object of the invention to provide a hoist mechanism, particularly a lifting device, of the type described which can be simply and quickly disassembled.

In accordance with the invention, a hoist mechanism includes an upright, hollow support post having a longitudinal opening through the side thereof, a threaded spindle rotatably mounted within the post aligned with the opening, a traveling nut engaged by the threaded spindle for linear movement therealong, a sliding carriage within the post moved by the traveling nut and a motor for effecting rotation of the threaded spindle. Aligned openings in the post and the carriage having a diameter greater than the diameter of the threaded spindle and the traveling nut permit both the threaded spindle and the traveling nut to be removed laterally through the opening in the support post when the threaded spindle is disconnected from its support.

With such a design, it is relatively easy to remove the threaded spindle and the traveling nut, since there is no need to remove the movable carriage, which is simply supported by the traveling nut. Easily releasable mountings for the threaded spindle on the drive unit and on the lower bearing are provided so that the threaded spindle may be changed in approximately 10 minutes, whereas the known types of construction often required 10 hours.

In the hoist mechanism herein, an external plate is disposed outside the support post and is removably connected to the carriage through the opening in the support post. The external plate can be designed as the load-bearing device or configured to enable attachment of a suitable load-bearing device, such as spaced lift arms. The lift arms for supporting a load to be lifted are attached to the external plate or, alternatively, secured directly to the carriage through the post opening, thereby eliminating the need for the external plate. The external plate can be advantageously constructed so that different load-bearing devices can be optionally attached to fulfill specific requirements. To provide stability, the external plate is configured to partially surround the support post. When the external plate or the lift arms are removed, the post opening is rendered accessible permitting removal of the threaded spindle therethrough.

In an exemplary embodiment, the external plate is provided with two slits at a distance from each other which extend transversely to the support post along the longitudinal opening so that a cover strip may be passed through the slits to cover the ope side of the support post and protect the threaded spindle and the traveling nut against damage and accumulation of dirt and the like.

The threaded spindle is joined to a coaxial motor drive shaft by an easily removable coupling. The threaded spindle and the drive shaft each have a flange formed at their adjoining ends with both flanges being held together by an axially split coupling sleeve. The axially split coupling permits disconnection and connection of the parts in a relatively short time. Further, the coupling allows the two flanges to be axially spaced apart so that the threaded spindle may be moved axially toward the drive shaft permitting easy removal of the threaded spindle from the bearing supporting its lower end.

In order to facilitate lateral removal and installation of the threaded spindle, the lower end of the threaded spindle, which is opposite the drive end, is radially supported by a bearing flexibly mounted. The flexible mounting allows the threaded spindle to be tilted slightly while it is within the bearing and thereafter withdrawn in an axial direction. An axially-split mounting may be provided for the lower bearing of the threaded spindle so that the threaded spindle and the lower bearing can both be removed laterally from the support post, if necessary.

According to a further exemplary embodiment of the invention, the threaded spindle or the motor shaft is provided with a one-way clutch which is engaged whenever the threaded spindle is rotated to lower the movable carriage. The weight of the motor and the load exerted on the threaded spindle through the traveling nut acts in an axial direction on the clutch. The clutch, in turn, is axially supported on a friction surface so that when the clutch is engaged, increased frictional force is applied to the threaded spindle to provide a braking force during lowering of a load. As a result, the traveling nut can be a frictionless nut thereby increasing operating efficiency.

According to another advantageous embodiment of the invention, means are provided to terminate operation of the hoist mechanism when movement of the carriage or lift arms is blocked. Attached to the movable carriage is an actuating element which, in turn, is mounted on a draw rod or a cable so that relative displacement between the carriage and the traveling nut causes the traveling nut or a following locknut to operate the actuating element so that the draw rod or the cable is moved. Movement of the draw rod or the cable activates a switch which cuts off the motor. Such a safety device is necessary to prevent hazardous operation whenever the movement of the carriage is blocked by a misplaced object under a lift arm.

Figure 6:
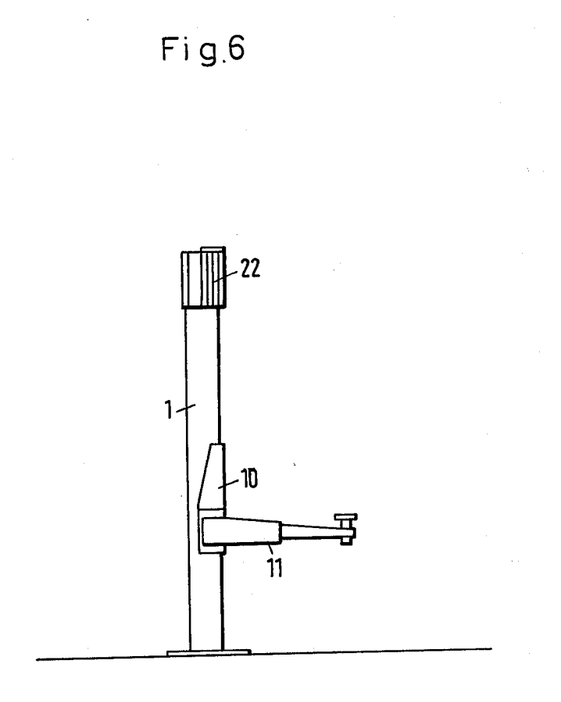
FIG. 6 shows a side elevational view of the hoist mechanism illustrating the entire configuration thereof.

The overall configuration of the hoist mechanism is seen in FIG. 6.

Figure 1:
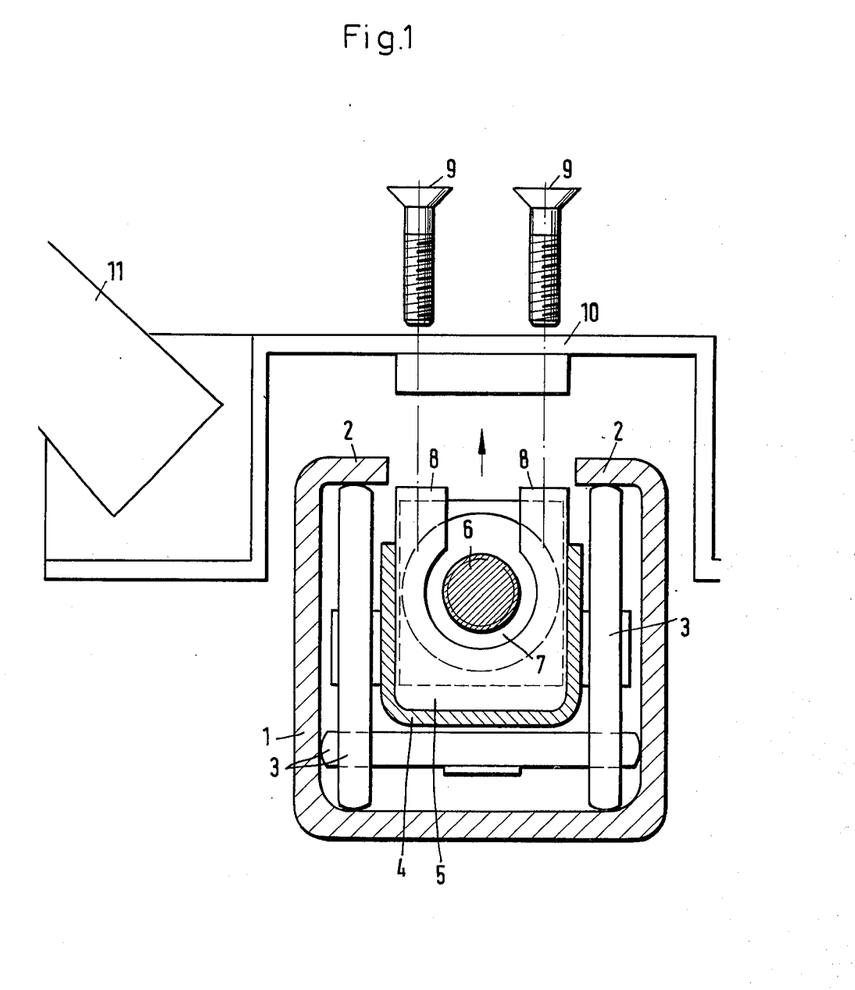
FIG. 1 is a fragmentary, exploded cross-sectional view of a hoist mechanism constructed according to the invention illustrating the configuration and arrangement of the support post and the movable carriage therein.
Figure 2:
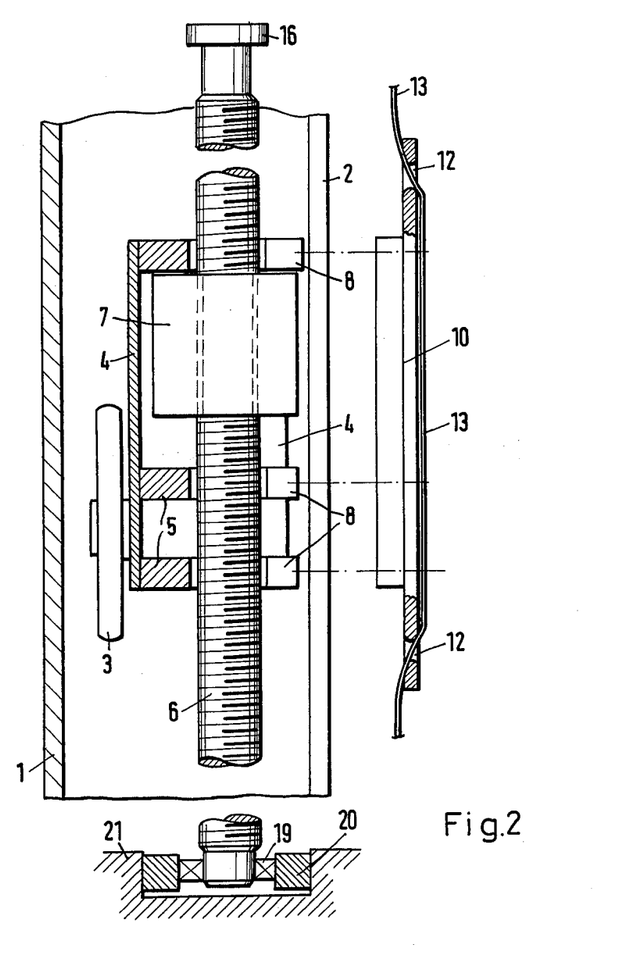
FIG. 2 is a fragmentary longitudinal cross-sectional view of the hoist mechanism illustrating the configuration and arrangement of the movable carriage, the threaded spindle and the traveling nut.

Referring to FIGS. 1 and 2, an illustrative embodiment of the invention is shown. A hollow, elongate, upright support post 1 having a U-shaped cross section includes lateral side walls of equal length with inwardly projecting edge segments 2 defining a longitudinally extending forward opening. Disposed within the support post 1 is a U-shaped movable carriage 4 having three spaced apart, generally U-shaped horizontal plates 5 secured between the walls thereof. The carriage 4 is disposed within the support post 1 so that the forward opening of the carriage 4 defined partially by the U-shaped plates 5 is substantially aligned with the forward opening in the support post 1.

Rotatably secured to the carriage 4 are guide rollers 3, which engage the inner surfaces of the edge segments 2 and the other side walls of the support post 1 to maintain the carriage 4 in proper alignment within the support post 1 and provide smooth movement therebetween.

A threaded spindle 6 is rotatably mounted within the support post 1 and is generally aligned with the forward opening in the support post 1. A traveling nut 7 is carried by the threaded spindle 6 for linear movement therealong in response to rotation of the threaded spindle 6. The diameter of the threaded spindle 6 and the traveling nut 7 is less than the width of the forward opening of the support post 1 or the carriage 4 so that the threaded spindle 6 and traveling nut 7 may be inserted into or removed from the support post 1 or carriage 4. The legs 8 of the U-shaped plates 5 are spaced apart at a distance greater than the diameter of the spindle 6 so that the spindle 6 may be moved therethrough, as indicated by the arrow in FIG. 1. However, the legs 8 are spaced apart at a distance less than the diameter of the traveling nut 7 so that the traveling nut 7 engages operatively one of the plates 5.

If the threaded spindle 6 is rotated on its elongate axis counterclockwise, for example, the traveling nut 7 will move along the spindle threads upwardly. If the threaded spindle 6 is rotated counterclockwise, the threaded nut 7 will move downwardly. As seen in FIG. 2, the carriage 4 will be moved upwardly when the traveling nut 7 is moved upwardly, since the carriage 4 rests on the traveling nut 7 via the undersurface of one of the U-shaped plates 5. Similarly, the carriage 4 will move downwardly as the traveling nut 7 moves downwardly. It should be evident that the traveling nut 7 is mounted with the carriage 4 so that it does not rotate relative thereto.

A generally upright external plate 10 is releasably secured to the legs 8 of the U-shaped plates 5 by bolts 9 which extend between the external plate 10 and the legs 8 through the forward opening of the support post 1. The external plate 10 is thereby movable relative to the outside of the support post via the movable carriage 4 inside of the support post 1. The external plate 10 is provided with a pair of horizontal brackets upon which a detachable lift arm, one of which is shown and designated 11, is pivotally secured to extend outwardly from the support post 1. It is evident, however, that the external plate 10 may be configured in any suitable manner to provide a means for engaging and supporting a load to be lifted. In FIG. 1, the external plate 10 is seen to have a width greater than that of the support post 1, while, in FIG. 2, the external pipe is seen to have a height greater than that of the carriage 4.

The external plate 10 has near its upper and lower edges a pair of spaced-apart slits 12 extending transversely to the support post 1. A cover strip 13 having a width substantially equal to the width of the support post 1 extends over the entire height of the support post 1 to cover the forward opening therein and has its upper and lower ends secured to the top and bottom of the support post 1, respectively. The cover strip 13 is threaded through the respective slits 12 so that it passes in front of the external plate 10 between the lift arms 11. The lateral edges of the slits 12 hold the cover strip 13 in alignment with the forward opening of the support post 1. Preferably, one end of the cover strip 13 is easily releasable from the support post so that it may be quickly removed during disassembly of the hoist mechanism.

Figure 3:
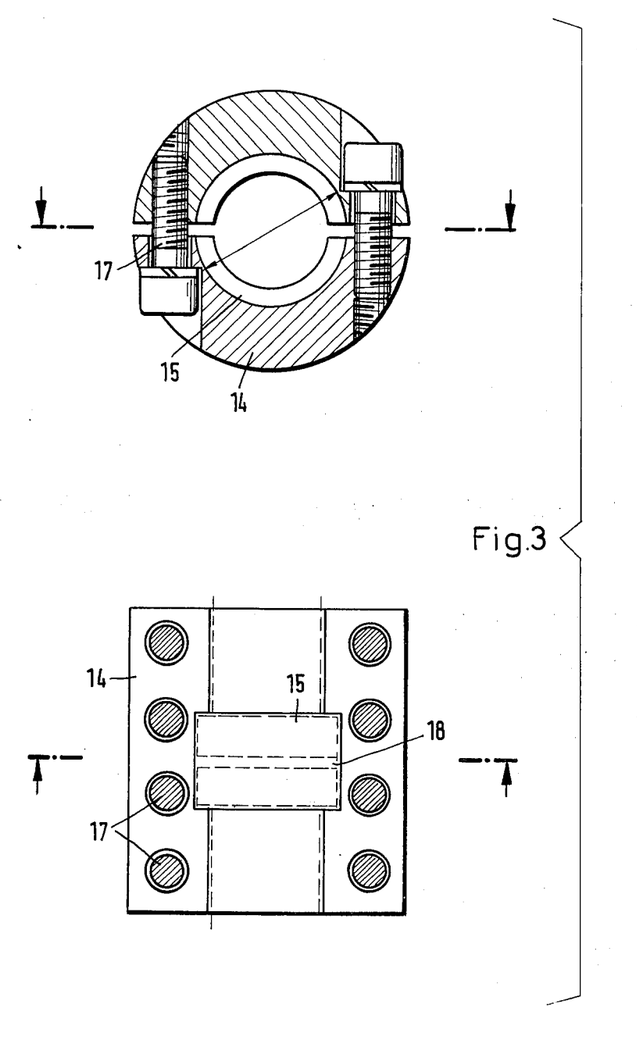
FIG. 3 is a lateral and a horizontal cross-sectional view showing a coupler for connecting the rotatable threaded spindle with the drive shaft.

A motor is provided for delivering power to rotate the threaded spindle 6. The motor is mounted at the upper end of the support post in a motor housing 22 (FIG. 6). The motor has a drive shaft 23 (FIG. 4) which is coaxially connected with the threaded spindle 6. As seen in FIG. 3, the drive shaft 23 and the threaded spindle 6 are releasably interconnected by a longitudinally split coupling sleeve 14. The threaded spindle 6 and the drive shaft 23 each have a radially extending flange at their adjoining coupling ends. The flange at the end of the threaded spindle 6 is designated 16 in FIG. 2. The coupling sleeve 14 has a recess 15 for receiving the flanges 16 and is secured about the flanges 16 by bolts 17 which lock the parts of the coupling sleeve 14 together. The driving force between the drive shaft 23 and the threaded spindle 6 is transmitted by friction from the drive shaft 23 through the coupling sleeve 14 to the threaded spindle 6. To facilitate easy insertion and removal of the threaded spindle 6, there is considerable play between the drive shaft 23 and the threaded spindle 6, as indicated by the space 18.

The axially split coupling 14 with tangentially engaged bolts 17 permits more rapid assembly and disassembly than would a flange coupling employing bolts running parallel to the spindle axis. It should be apparent that a positive connection could be utilized in place of the frictional connection provided by the coupling shown herein. Further, the drive shaft 23 may either be an extension of the motor shaft or the output shaft of a transmission driven indirectly by the motor.

The lower end of the threaded spindle 6 is rotatably supported at the base 21 of the support post 1 by a radial load ball bearing 19 providing a low friction mounting. The bearing 19 is, in turn, mounted to the base 21 by a resilient ring 20 made of rubber or the like. The resiliency of the ring 20 permits the bearing 19 and the threaded spindle 6 to be tilted so that the threaded spindle 6 may be easily removed or placed into the bearing 19.

Alternatively, the bearing 19 can be rigidly secured to the base 21. Removal of the threaded spindle 6 is then effected by moving the threaded spindle 6 directly upward out of the bearing 19. Thereafter, the threaded spindle 6 is removed laterally from the support post 1.

This required that there be sufficient axial spacing between the threaded spindle 6 and the drive shaft 23 to permit adequate axial movement allowing removal. As a result, the distance 18 between the adjoining ends of the threaded spindle 6 and the drive shaft 23 will be somewhat greater than that illustrated in FIG. 3.

In an alternative construction, a split mounting for the bearing 19 similar to the coupling sleeve 14 may be used so that the bearing 19 may be removed laterally along with the threaded spindle 6 from the support post 1. Because of the shorter installation time, however, one of the previously-described forms of construction is preferred. In the case of a rather large space 18 between the adjoining ends in the coupling sleeve 14, a suitable spacer (not shown) can be inserted to prevent axial displacement of the threaded spindle 6 when the coupling sleeve 14 is assembled. This spacer can be designed to provide a positive junction between threaded spindle 6 and drive shaft 23. For example, diagonally-running grooves in the opposing flanges may cooperatively engage corresponding cooperating ribs on the spacer. Such a construction provides increased frictional contact within the coupler sleeve 14 or acts as a backup for the contact between the drive shaft 23 and the threaded spindle 6.

Figure 4:
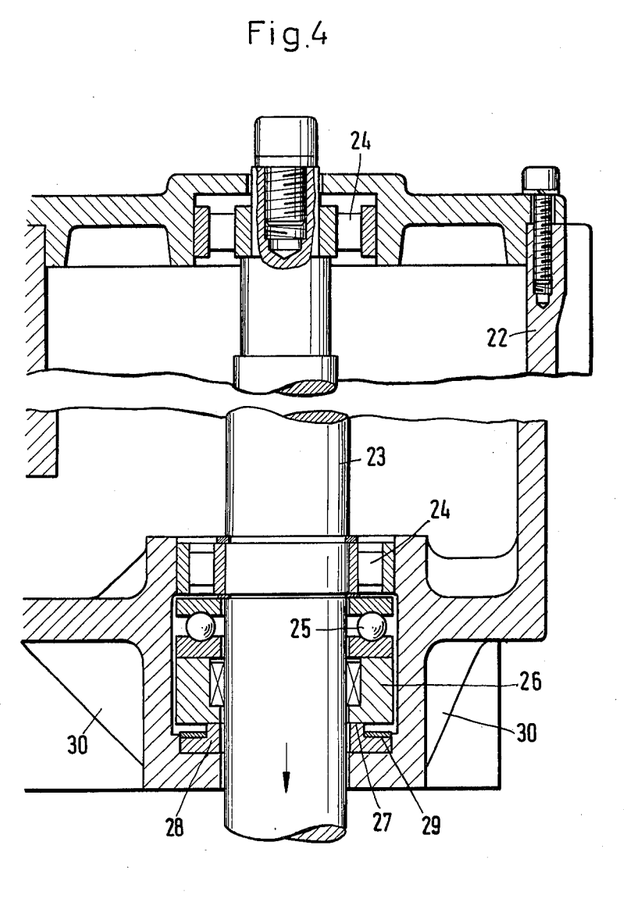
FIG. 4 is a fragmentary longitudinal cross-sectional view through the motor housing illustrating the details of the motor mounting.

In FIG. 4, the motor housing 22, which is located at the upper end as an extension of the support post 1, is illustrated. For the purpose of simplicity, the motor is omitted and only its shaft 23 is shown. The motor shaft 23 is mounted within the housing 22 by radial load bearings 24. An axial load bearing 25 supports the weight of the motor and the load which is exerted on the threaded spindle 6. The axial bearing 25, in turn, is supported by a one-way clutch 26, which may be a free-wheeling cam and wedge construction. The clutch 26 is disengaged when the motor shaft 23 is rotated in one direction to lift the carriage 4 and its load, while it is engaged to turn with the motor shaft 23 when the motor shaft 23 is rotated in the other direction to lower the carriage 4 and its load. The housing of the clutch 26 lies on a friction surface 27 which is designed so that the friction surface 27 and the clutch housing, when the clutch 26 is engaged, is sufficient to retard rotation of the threaded spindle 6 and provide automatic braking during lowering of the load. As a result, a frictionless nut, e.g., a ball bearing nut or a planetary roller nut, can be utilized as the traveling nut to obtain a corresponding increase in performance in the raising of the load. It should be evident that when the load is being raised, the clutch 26, is disengaged so that no braking force is generated between the clutch 26 and the friction surface 27 to retard rotation of the threaded spindle 6.

In the embodiment shown in FIG. 4, the friction surface 27 is disposed on a ring 28 which may consist of an appropriate material having a high friction coefficient. The ring 28 is stepped and has on the lower section, a friction facing 29 providing a safety feature. In the event abrasion wears away the friction surface 27 of the upper section, the clutch 26 rests on the friction facing 29 so that the load can no longer be moved downwards without substantial mechanical assistance.

The heat generated by friction in the thrust bearing 25 and between the clutch 26 and the friction surface 27 is dissipated by cooling fins 30, which are radially distributed completely around this section of the motor housing. The clutch 26 working with a friction surface may, of course, be located in other suitable positions, e.g., within the support post 1, but, preferably, the arrangement in the area of the motor housing is provided, since the heat produced can best be dissipated in this way.

Figure 5:
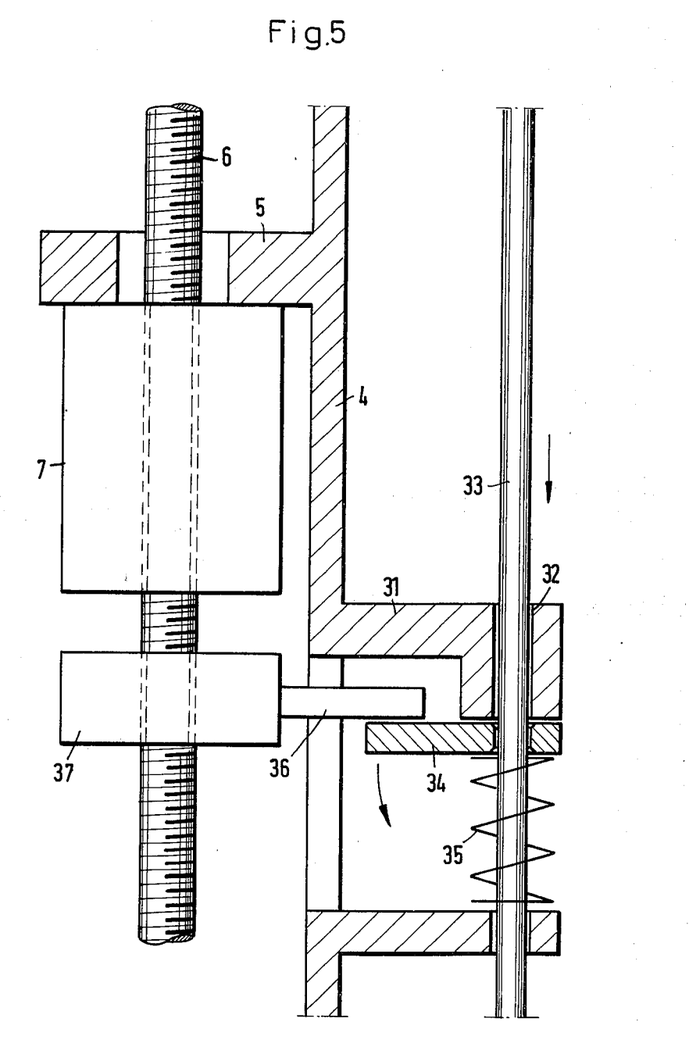
FIG. 5 is a fragmentary schematic view of a safety device for the hoist mechanism installed on the movable carriage.

Referring to FIG. 5, a safety device is installed on the carriage 4 which discontinues operation of the motor if, for example, the lift arm 11 is blocked by an out-of-place object whenever the load is being lowered. To accomplish this function, a projection 31 is provided on the carriage 4 and has an bore 32 through which a draw rod 33 installed in the support post 1 extends. The draw rod 33 operates a switch (not shown) provided in the area of the motor at the upper end of the support post 1 and thereby controls operation of the motor. During normal operation of the hoist mechanism, the projection 31 slides along the draw rod 33 without engaging it.

Disposed in a recess in the projection 31 is a tilting element 34 which is provided with an aperture (not numbered) through which the draw rod 33 extends. The tilting element 34 is held by a spring 35 against the lower surface of the plate 5 which is perpendicular to the axis of the draw rod 33. During normal operation, the tilting element 34 is not operatively engaged with the draw rod 33. An actuating rod 36 is attached to a locknut 37 and cooperates with the tilting element 34. The locknut 37, which is normally employed with the traveling nut 7, follows the traveling nut 7 during the rotary motion of the threaded spindle 6. The locknut 37 prevents accidental downward movement of the traveling nut 7. For the purpose of simplicity, the locknut 37 is not shown in FIG. 2. It should be evident that the actuating rod 36 could also be located on the traveling nut 7.

If, during the lowering of the carriage 4, the carriage 4 is blocked by an object which was carelessly left standing or lying under the lift arm 11 or the external plate 10 (FIG. 1), the carriage 4 will remain at the blocked height. However, continued rotation of the threaded spindle 6 effected by the drive motor causes continued lowering of the traveling nut 7 and the locknut 37 relative to the carriage 4. The tilting element 34 is then separated by the actuating rod 36 from its contact surface and tilted downward in the direction of the arrow shown in FIG. 5, whereupon the tilting element 34 grips the draw rod 33 and pulls it downward. The displacement of the draw rod 33, activates the switch which shuts off the motor. When the carriage 4 is subsequently raised, the traveling nut 7 again comes into contact with the plate 5 and, at the same time, the tilting element 34 is released by the actuating rod 36 and forced back to the illustrated position by the spring 35. By appropriately dimensioning the aperture in the tilting element 34 and its distance from the actuating rod 36, a suitable delay or immediate activation of the draw rod 33 can be effected. In place of the draw rod 33, a cable with a corresponding clamping device can be utilized, which is activated when relative movement between the traveling nut 7 or the locknut 37 and the carriage 4 is encountered.

A hoist mechanism constructed according to the invention broadly consists of a guiding device in the form of a hollow section or a support post 1, a sliding carriage with a load-bearing device moving in the guiding device and a motor installed at the end of the guiding device as an extension thereof. The external plate 10 can be designed so that different components can be attached to it. Thus, a hoist mechanism can be used for lifting of goods to be conveyed, or for lowering and picking up parts on an assembly line, or, as shown in the embodiment illustrated in FIG. 6, as a lift jack for trucks or other vehicles. Another possible application for the mechanism consists in attaching to the external plate 10 the guiding device 1 of a further hoist mechanism, so that in this way a cross table or a telescoping extensible arm can be formed. If the hoist mechanism is used as a machine slide or the like, the traveling nut 7 is located in direct contact between two plates 5 in the sliding carriage so that displacement in both directions corresponding to the rotary movement of the threaded spindle occurs. Various modifications of the described embodiments are possible according to the particular field of application of such a hoist mechanism.

For facile removal of the threaded spindle 6 and the U-shaped carriage 4, different easily and rapidly releasable connecting elements may be employed between the drive shaft 23 and the threaded spindle 6 as well a the lower bearing 19. In the case of a rigid bearing mounting, the carriage 4 may be formed with an opening on the front side with the cover strip 23 running between the arms of the carriage 4.

Instead of the described safety device which stops operation when the load-bearing device is blocked, actuator elements operated by means of rollers may be provided, which, in the event of relative motion between carriage and traveling nut, exert a clamping effect on a cable or the like.

It is also conceived that the described axial thrust bearing 25, upon which the motor weight and/or load are supported, may be located at the lower end of the support post, particularly in cases where threaded spindle is driven through a transmission. The threaded spindle 6, rather than the motor shaft, would then be supported by the one-way clutch. In such a case, the clutch is located between the axial load bearing of the threaded spindle and the axial support surface for the bearing so that the force exerted by the load during lowering of the carriage acts upon the bearing support surface in the axial direction of the threaded spindle.

I claim:

1. A hoist mechanism for lifting a load comprising:
an elongate hollow post having a longitudinally extending opening through the side thereof;
a threaded spindle rotatably mounted within said post and being generally aligned longitudinally with the opening of said post;
a traveling nut carried by said spindle for linear movement therealong in response to rotation of said spindle, the opening in said post having a width at least as great as the diameter of said traveling nut;
a movable carriage within said post engaged by said traveling nut to move therewith along a predetermined path defined by said spindle, said carriage having an opening generally aligned with the opening of said post and with said spindle, the opening of said carriage having a width of at least as great as the diameter of said traveling nut, whereby said spindle and said traveling nut may be removed laterally through said openings from an operative position within said post; and
power means carried by said post for rotating said spindle.

2. The hoist mechanism of claim 1 wherein said power means is disposed adjacent one end of said spindle, and further including means for releasably connecting said one end of said spindle to said power means.

3. The hoist mechanism of claim 2 wherein said power means has a drive shaft coaxially arranged with said spindle, said connecting means connecting said spindle to said drive shaft.

4. The hoist mechanism of claim 3 further including a bearing supporting said spindle at the end remote from said drive shaft, said drive shaft and said spindle being spaced apart coaxially so that said spindle may be moved axially toward said drive shaft when disconnected and withdrawn from said bearing.

5. The hoist mechanism of claim 3 wherein said drive shaft and said spindle each have a radially extending flange, said flanges being adapted to be releasably interconnected.

6. The hoist mechanism of claim 5 wherein said connecting means comprises a coupling sleeve having a recess for receiving said flanges, said coupling sleeve being adapted to be positioned about said flanges to secure said drive shaft and said spindle together.

7. The hoist mechanism of claim 2 further including a bearing carried by said post to rotatably mount the other end of said spindle.

8. The hoist mechanism of claim 7 wherein said bearing is flexibly secured to said post so that said spindle may be tilted relative to said post while remaining within said bearing.

9. The hoist mechanism of claim 1 further including an external plate positioned outside of said post and means extending between said external plate and said carriage through the opening of said post for releasably mounting said external plate to said carriage.

10. The hoist mechanism of claim 9 wherein said external plate includes means for engaging a load to be lifted.

11. The hoist mechanism of claim 10 wherein said engaging means includes one or more arms extending outwardly from said post, said arms being releasably attached to said external plate.

12. The hoist mechanism of claim 9 further including a strip covering the opening in said support post, said strip having its upper and lower ends secured to the top and bottom of said support post, respectively, said external plate passing behind said strip as said external plate is moved upwardly and downwardly on said support post.

13. The hoist mechanism of claim 12 wherein said plate extends transversely across the opening of said post and has a pair of spaced-apart elongate slits extending transversely to said post, said strip being threaded through each of said slits so that a portion of said plate between said slits lies between said post and said strip and is connected to said carriage.

14. The hoist mechanism of claim 1 wherein said carriage includes a longitudinally extending plate having a U-shaped transverse cross section partially enclosing said spindle, a generally U-shaped plate fixed to said first-named plate extending transversely to said spindle, said traveling nut engaging the lower surface of said U-shaped plate so that movement of said traveling nut on said spindle moves said carriage, the legs of said U-shaped plate being disposed on either side of said spindle having an opening generally aligned with the opening of said post, said longitudinally extending plate disposed rearwardly of the spindle remote from the opening of said housing and of said post.

15. The hoist mechanism of claim 14 further including guide means carried by said carriage, said guide means bearing against the interior of said post to maintain the carriage in proper alignment and provide smooth movement therebetween.

16. A hoist mechanism for lifting a load comprising:

an elongate hollow post;

a threaded spindle rotatably mounted said post and having a vertically-oriented rotational axis;

a traveling nut carried by said spindle for linear movement therealong upwardly and downwardly in response to rotation of said spindle;

a movable carriage within said post resting upon and supported by said traveling nut and being adapted to lift loads placed thereon, said carriage being pushed upwardly by said traveling nut when said traveling nut moves upwardly and following said traveling nut when said traveling nut moves downwardly;

power means carried by said post for rotating said spindle;

switch activating means for deactivating said power means to terminate rotation of said spindle;

an actuator carried with said carriage, said actuator being adapted to be moved between a operative position engaging said switch activating means and an inoperative position disengaged from said switch activating means; and means for operating said actuator positioned above said actuator and being adapted to move downwardly along said spindle as said traveling nut moves downwardly, said operating means operating said actuator whenever said traveling nut moves downwardly away from said carriage sufficiently to engage said actuator, whereby said actuator trips said switch activating means to deactivate said power means and terminate further movement of said traveling nut.

17. The hoist mechanism of claim 16 wherein said switch activating means is elongate member generally coextensive with said spindle, said actuator including a contact surface extending about said elongate member said actuator being tilted relative to said elongate member when engaged by said engaging means so as to be clamped on said elongate member, further motion of said engaging means moving said actuator and elongate member to deactivate said power means.

18. A hoist mechanism comprising:

a hollow post;

a threaded spindle rotatably mounted within said post and having a vertically-oriented rotational axis;

a traveling nut carried by said spindle for linear movement upwardly therealong in response to rotation of said spindle in one direction and downwardly therealong in response to rotation of said spindle in other direction, said traveling nut being designed to move along said spindle in a substantially friction-free manner;

a movable carriage engaged by said traveling nut to move therewith and being adapted to lift loads placed thereon;

power means including a drive shaft for rotating said spindle and a housing for said power means and drive shaft;

brake means carried by one of said post and said power means housing, said brake means being movable into engagement and out of engagement with one of said drive shaft and said spindle, said brake means when engaged providing friction force to retard rotation of said spindle; and clutch means for selectively effecting engagement between said brake means and one of said drive shaft and said spindle, said clutch means when said drive shaft and spindle are rotated in said other direction effecting engagement between said brake means and said one of said drive shaft and spindle to at least partially retard rotation of said spindle and thereby brake said traveling nut, said clutch means when said drive shaft and spindle are rotated in said one direction effecting disengagement between said brake means and said one of said drive shaft and spindle.

19. The hoist mechanism of claim 18 wherein said power means is a motor disposed within said housing which is carried by said post, said clutch means being disposed within said motor housing.

20. The hoist mechanism of claim 19 further including cooling fins carried by said motor housing adjacent said clutch means.

21. The hoist mechanism of claim 18 wherein said bearing means includes a brake surface axially supporting said clutch means, said clutch means having a housing supporting an axial load, said spindle rotating freely with respect to said clutch housing when the spindle is rotated in said other direction, said clutch housing being locked to said spindle when the spindle is rotated in said one direction with said clutch housing being moved along said bearing surface so that rotation of said spindle is effected by overcoming frictional force generated between said clutch housing and said bearing surface.

22. The hoist mechanism of claim 21 wherein said bearing surface is stepped, said clutch housing resting on an upper bearing surface, a second lower bearing surface having a friction surface, said friction surface contacting said clutch housing whenever said upper bearing surface is reduced by wear a predetermined amount.

\* \* \* \* \*